3,516,932
CLARIFICATION OF WATER

Ross M. Hedrick, St. Louis, and David T. Mowry, Brentwood, Mo., assignors to Monsanto Company, St. Louis, Mo., a corporation of Delaware
No Drawing. Continuation-in-part of application Ser. No. 230,701, June 8, 1951. This application June 4, 1962, Ser. No. 199,659
Int. Cl. B01d 21/01; C02b 1/20; C02c 5/02
U.S. Cl. 210—53     16 Claims This application is a continuation-in-part of abandoned application Ser. No. 230,701, filed June 8, 1951 by Ross M. Hedrick and David T. Mowry.

The present invention relates to a method for clarification of water containing suspended matter employing synthetic polyelectrolytes as a settling aid.

According to the present invention, clarification of water containing suspended matter is effected by adding to such water a synthetic water-soluble polyelectrolyte which is a linear polymer containing amide substituents. The polymer consists of carbon atoms joined by single valence linkages and contain amide nitrogen in substituents thereon. Particles suspended in water generally have a negative charge, although under special conditions existing in some waters, positively charged particles may also be encountered. Clarification (including flocculation and/or settling of suspended particles) in such water according to the present invention is effected by the controlled addition thereto of certain water-soluble polyelectrolytes. The amount of polyelectrolyte added should be such as to produce a concentration not in excess of 0.1% by weight.

Water containing suspended particles which may be treated by the present invention may have its origin either in natural or artificial sources, including industrial and sanitary sources. Waters containing suspended particles of natural origin are usually surface waters, wherein the particles are suspended soil particles (silt), although subsurface waters may also be treated according to the present invention. Water having its origin in industrial process (including sanitary water) operations may contain many different varieties of suspended particles. These particles are generally the result of the particular industrial or sanitary operation concerned. Prior to discharging such industrial waste waters into natural water courses it generally is desired that the suspended matter be removed.

The present process may likewise be applied to water contained in stock or fish ponds, lakes or other natural or artifical bodies of water containing suspended solids. It may be applied to industrial water supplies either in preparation therefor, during or after use and prior to disposal. It may be applied to sanitary water supplies either for the elimination of suspended solids prior to use for such purposes, or it may be applied to such waters which have become contaminated with impurities from any source.

Most naturally occurring waters contain an amount of simple electrolytes (sodium, potassium, ammonium, calcium, aluminum salts, etc.) in excess of that necessary for the initial aggregation (flocculation) of the ultimate silt particles. This is likewise true of particles of suspended material in industrial or sanitary waters. The ultimate particles of silt or other materials are therefore naturally somewhat aggregated (flocculated) by reason of the presence of such electrolytes. However, the forces binding such ultimate particles together are not great and moreover are not such as to generally effect either rapid flocculation or strong enough to prevent deflocculation.

The synthetic polyelectrolytes herein disclosed combine with the charged particles causing rapid flocculation and also reinforce the formed aggregates of particles causing a general tightening or bonding together of the initial aggregates and an increased rate of coagulation and settling, thus forming a less turbid supernatant liquid.

The addition of the polyelectrolyte to the water suspension should be made in such a fashion that the resulting aggregation of the particles takes place uniformly throughout the body of water. In order to obtain a uniform addition of the polyelectrolyte to the water-borne suspension it is generally desirable to prepare a relatively dilute stock solution of the water-soluble-polyamide and then to add such solution to the body of water in the proportions indicated above. Clarification may take place either in the natural body of water or it may be caused to take place in hydraulic thickeners of known design.

The amount of polyelectrolyte added to water containing charged particles will depend in general upon the number of such particles and the volume of water to be treated. It is desired, of course, to employ sufficient polyelectrolyte so that flocculation will take place without causing the formation of stable dispersion of the particles. In the past, solutions of polyelectrolytes have been employed in concentration above 0.5% (U.S. Pat. 1,976,679) in order to form stable aqueous dispersions of a variety of finely divided substances.

The precipitating action of the polyelectrolytes may be employed in the application of loading or filling materials to textiles or paper in order to obtain special effects. As an example, rosin size is often added to paper pulp prior to the formation of the sheet and precipitated in the aqueous pulp by aluminum sulfate (paper makers alum). While admirably serving this purpose it is recognized that aluminum sulfate is objectionable not only because of its actual corrosiveness upon metals but also because of its hardening effect on organic substances such as cellulose.

By adding polyelectrolyte to the paper machine beater, either prior to or after the addition of size or filler, complete precipitation can be achieved without the use of alum. The resulting paper is obtained thus substantially free of electrolytes and the white paper is clear and free of suspended particles. In this connection a difficulty often encountered with alum when applying certain colors to paper, which difficulty is manifested by a weakening of the color, is also avoided.

The following examples illustrate various water-soluble polymers and the method of preparation:

POLYACRYLAMIDE

Ten grams of acrylamide and 0.05 gram of potassium persulfate were dissolved in 90 ml. of water and heated in an oven at 60° C. for five hours. Because of some hydrolysis the polymer contained some ammonium salt and imide groups in addition to acrylamide units. The solution was diluted with 400 ml. of water for use.

ACRYLAMIDE-ACRYLONITRILE COPOLYMER

Ninety grams of acrylamide, 10 grams of acrylonitrile, 0.2 gram of potassium persulfate and 0.1 gram of sodium bisulfite were dissolved in one liter of 50 percent methyl alcohol and heated for four days at 60° C. The resultant precipitated polymer was then filtered, washed with methanol and dried. Two grams of this material was dissolved in 98 ml. of water for evaluation.

The present polyelectrolytes may be used for flocculating and settling a large variety of suspended solids and their use is of considerable advantage where it is desired to avoid the presence of electrolytes such as those furnished by alum and ferric chloride or sulfate.

Typical examples of clarification processes which may be carried out according to our invention are those connected with paper making, clay treatment processes, pigment preparation, etc., or in other words, processes in which suspended particles are to be recovered or precipitated from large amounts of water.

For optimum beneficial results the molecular weight of the polymer is of some importance. It appears that molecular weights should be in excess of 5,000 and preferably in excess of about 15,000. Molecular weight may desirably be within the range of from 30,000 to 100,000 and even higher. The molecular weights should, however, not be so high as to yield insoluble polymers.

EXAMPLE 1

A solution containing 0.1 g. of polyacrylamide was added to 3 liters of turbid river water containing suspended silt and having a pH of 8.05 and then 0.13 g. of aluminum sulfate added as a solution. The resulting solution was stirred for 20 minutes and then allowed to settle. A fast settling floc was obtained. Alum alone gave a slow settling floc. The same amount of polyacrylamide added after the alum also improved the rate of settling of the floc.

EXAMPLE 2

A solution containing 0.13 g. of "Ferrisul" (ferric sulfate) was added to 3 liters of turbid river water. This was sufficient for flocculation. A much faster settling floc was obtained when the "Ferrisul" was followed with a solution of 0.1 g. of polyacrylamide.

EXAMPLE 3

To about 100 g. of Miami silt loam suspended in 1 liter of tap water was added 0.1 g. of polyacrylamide in 5 cc. of water. The soil immediately formed into flocs and settled out. This settling action was not impaired by the presence of 5 g. of sodium chloride, 5 g. of ferric chloride or 5 g. of aluminum sulfate.

As shown in these examples, inorganic electrolytes may be added before or after the treatment of the suspension with the polyamides. If the initial aggregation by electrolytes in the aqueous suspension is adequate, the addition of electrolyte is not essential to a practicable process. If very pure water and even the surface water in some areas are used, the desirable inorganic electrolyte may be deficient. Under such cirmumstances the addition of the inorganic salts will serve a useful purpose.

The details of the invention as described above are not intended to be limitations on the scope of the invention except to the extent defined in the attached claims.

What is claimed is:

1. The method of clarifying an aqueous suspension of solid inorganic particles which is in flocculated condition due to the presence of inorganic salts which comprises adding to the suspension a polyacrylamide.

2. The method of clarifying an aqueous suspension of clay which is in flocculated condition due to the presence of inorganic salts which comprises adding to the suspension of polyacrylamide.

3. The method of clarifying an aqueous suspension of solid inorganic particles which is in flocculated state due to the presence of a flocculating amount of inorganic salts, which comprises adding to the suspension an amount not in excess of 0.1% by weight of a polymer of acrylamide having a molecular weight greater than 5000.

4. The method of clarifying an aqueous suspension of clay which is in flocculated state due to the presence of a flocculating amount of inorganic salts, which comprises adding to the suspension an amount not in excess of 0.1% by weight of a polymer of acrylamide having a molecular weight greater than 5000.

5. The method of clarifying an aqueous suspension of solid inorganic particles which comprises adding sufficient inorganic salts to effect a flocculation and then adding to the suspension up to 0.1% by weight of a polyacrylamide having a molecular weight greater than 5000.

6. The method of clarifying an aqueous suspension of clay which comprises adding sufficient inorganic salts to effect a flocculation and then adding to the suspension up to 0.1% by weight of a polyacrylamide having a molecular weight greater than 5000.

7. The method of settling inorganic particles suspended in water containing dissolved therein sufficient inorganic electrolyte to induce aggregation of the particles, which comprises adding to the suspension up to 0.1% of a polymer of acrylamide having a molecular weight greater than 5000.

8. The method of settling clay suspended in water containing dissolved therein sufficient inorganic electrolyte to induce aggregation of the clay, which comprises adding to the suspension up to 0.1% of a polymer of acrylamide having a molecular weight greater than 5000.

9. The method of settling inorganic particles suspended in water which comprises adding sufficient inorganic electrolyte to induce aggregation of the suspended particles and then adding to the aggregated suspension up to 0.1% of a polymer of acrylamide having a molecular weight greater than 5000.

10. The method of claim 9 in which the polyacrylamide contains some ammonium salt and imide groups as well as acrylamide units.

11. The method of claim 9 in which the polymer is a copolymer of acrylamide and acrylonitrile.

12. The method of settling clay suspended in water which comprises adding sufficient inorganic electrolyte to induce aggregation of the suspended clay and then adding to the aggregated suspension up to 0.1% of a polymer of acrylamide having a molecular weight greater than 5000.

13. The method of settling inorganic particles in aqueous suspension which particles are in flocculated state in the presence of sufficient inorganic electrolyte, which comprises adding to the flocculated suspension a polyacrylamide.

14. The method of settling clay in aqueous flocculated suspension due to the presence of sufficient inorganic electrolyte, which comprises adding to the flocculated suspension a polyacrylamide.

15. A process of settling mineral suspensions containing finely-divided mineral solids which comprises treating said mineral suspensions with a flocculating amount of inorganic salts and with a linear polymer having

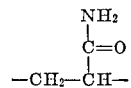

as its repeating unit.

16. A process of settling mineral suspensions containing finely-divided mineral solids which comprises treating said mineral suspensions with sufficient inorganic salts to effect a flocculation and then adding to the suspension up to 0.1% of a water soluble linear polymer having

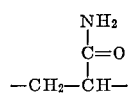

as its repeating unit and allowing the flocculated mineral solids to settle.

References Cited

UNITED STATES PATENTS

| | | | |
|---|---|---|---|
| 2,351,259 | 6/1944 | Fueffers | 210—54 X |
| 2,728,724 | 12/1955 | Gloor | 210—54 X |
| 2,981,630 | 4/1961 | Rowland | 210—54 |
| 2,995,512 | 8/1961 | Weidner et al. | 210—54 |
| 2,718,497 | 9/1955 | Oldham. | |
| 2,616,818 | 11/1952 | Azorlosa. | |
| 2,552,775 | 5/1951 | Fischer et al. | 252—8.5 |
| 2,625,529 | 1/1953 | Hedrick et al. | 210—54 XR |
| 2,687,374 | 8/1954 | Mowry et al. | |

(Other references on following page)

UNITED STATES PATENTS

| | | | |
|---|---|---|---|
| 2,729,557 | 1/1956 | Booth et al. | 75—105 |
| 2,740,522 | 4/1956 | Aimone et al. | 209—166 |
| 2,980,610 | 4/1961 | Ruehrwein | 210—58 |
| 3,128,249 | 4/1964 | Pye et al. | 210—53 |
| 3,130,167 | 4/1964 | Green | 252—181 |
| 3,157,595 | 11/1964 | Johnson et al. | |

FOREIGN PATENTS

| | | |
|---|---|---|
| 163,501 | 6/1955 | Australia. |
| 475,671 | 11/1937 | Great Britain. |

OTHER REFERENCES

Rubber Chemistry & Technology, vol. 13, pp. 408–414 (1940), article by Schweitzer.

Michaels and Morelos: "Polyelectrolyte Adsorption by Kaolinite," Industrial Engineering Chemistry, vol. 47, No. 9, September 1955, pp. 1801–1809.

Weiser: "The Hydrous Oxides," McGraw-Hill Book Co., New York, 1926, pp. 26–27, 55–57, and 119–121.

Ruehrwein and Ward: "Mechanism of Clay Aggregation by Polyelectrolytes," Soil Science, vol. 73, No. 6, June 1952, pp. 485–492 (& p. 419).

Michaels: "Aggregation of Suspensions by Polyelectrolytes," Industrial & Engineering Chemistry, vol. 46, No. 7, July 1954, pp. 1485–1490.

MORRIS O. WOLK, Primary Examiner

U.S. Cl. X.R.

210—51, 52, 54